US009600193B2

(12) United States Patent
Ahrens et al.

(10) Patent No.: US 9,600,193 B2
(45) Date of Patent: Mar. 21, 2017

(54) REPLICATING SNAPSHOTS FROM A SOURCE STORAGE SYSTEM TO A TARGET STORAGE SYSTEM

(71) Applicant: Delphix Corporation, Menlo Park, CA (US)

(72) Inventors: Matthew Allan Ahrens, San Francisco, CA (US); Matthew Benjamin Amdur, Cambridge, MA (US); Eric Noah Schrock, Medford, MA (US); Hubert Ken Sun, Menlo Park, CA (US)

(73) Assignee: Delphix Corporation, Menlo Park, CA (US)

( * ) Notice: Subject to any disclaimer, the term of this patent is extended or adjusted under 35 U.S.C. 154(b) by 50 days.

(21) Appl. No.: 14/816,775

(22) Filed: Aug. 3, 2015

(65) Prior Publication Data
US 2016/0224259 A1    Aug. 4, 2016

Related U.S. Application Data

(60) Provisional application No. 62/111,955, filed on Feb. 4, 2015.

(51) Int. Cl.
G06F 12/00        (2006.01)
G06F 3/06         (2006.01)
G06F 11/14        (2006.01)

(52) U.S. Cl.
CPC ............ *G06F 3/0619* (2013.01); *G06F 3/065* (2013.01); *G06F 3/067* (2013.01); *G06F 11/14* (2013.01); *G06F 11/1456* (2013.01)

(58) Field of Classification Search
None
See application file for complete search history.

(56) References Cited

U.S. PATENT DOCUMENTS 5,819,292 A    10/1998  Hitz et al.
6,748,504 B2 *  6/2004  Sawdon .............. G06F 11/1435
                                                707/999.202

(Continued)

FOREIGN PATENT DOCUMENTS

JP    2005532611 A    10/2005

OTHER PUBLICATIONS

Final Written Decision, Before the Patent Trial and Appeal Board of United States Patent and Trademark Office, Case IPR2015-00034, U.S. Pat. No. 8,150,808 B2, Apr. 16, 2016, 100 Pages.

(Continued)

*Primary Examiner* — Brian Peugh
(74) *Attorney, Agent, or Firm* — Fenwick & West LLP

(57) ABSTRACT

A source storage system replicates snapshots stored on the source storage system to a target storage system. The source storage system stores a plurality of snapshots. The source storage system also stores parent child relationships between snapshots. The source storage system allows child snapshots of a parent snapshot to be modified independent of each other. The source storage system determines changed blocks of a snapshot compared to a previously transmitted snapshot and sends only the changed blocks to the target storage system. The source storage system determines the changed blocks of a snapshot compared to a previously replicated snapshot based on time of creation of a common ancestor of two snapshots. The source storage system transmits a data block of a snapshot if either the data block or a corresponding data block of the previously replicated snapshot was modified after the creation of the common ancestor snapshot.

23 Claims, 9 Drawing Sheets

(56) References Cited

U.S. PATENT DOCUMENTS

| | | | |
|---|---|---|---|
| 7,107,385 | B2 | 9/2006 | Rajan et al. |
| 7,225,204 | B2 | 5/2007 | Manley et al. |
| 7,334,094 | B2 | 2/2008 | Fair |
| 7,334,095 | B1 | 2/2008 | Fair et al. |
| 7,340,461 | B2 | 3/2008 | Vishlitzky et al. |
| 7,373,364 | B1 | 5/2008 | Chapman |
| 7,386,695 | B2 | 6/2008 | Fuente |
| 7,409,511 | B2 | 8/2008 | Edwards et al. |
| 7,457,982 | B2 | 11/2008 | Rajan |
| 7,539,836 | B1 | 5/2009 | Klinkner |
| 7,587,563 | B1 | 9/2009 | Teterin et al. |
| 7,590,660 | B1 | 9/2009 | Richards et al. |
| 7,631,021 | B2 | 12/2009 | Sarma et al. |
| 7,743,035 | B2 | 6/2010 | Chen et al. |
| 7,757,056 | B1 | 7/2010 | Fair |
| 7,822,758 | B1 | 10/2010 | Prakash et al. |
| 7,827,366 | B1 | 11/2010 | Nadathur et al. |
| 7,856,424 | B2 | 12/2010 | Cisler et al. |
| 7,877,357 | B1 | 1/2011 | Wu et al. |
| 7,937,547 | B2 | 5/2011 | Liu et al. |
| 7,941,470 | B2 | 5/2011 | Le et al. |
| 7,996,636 | B1 | 8/2011 | Prakash et al. |
| 8,037,032 | B2 | 10/2011 | Pershin et al. |
| 8,150,808 | B2 | 4/2012 | Zha et al. |
| 8,280,858 | B2 | 10/2012 | Ahrens et al. |
| 8,311,988 | B2 | 11/2012 | Cisler et al. |
| 8,532,973 | B1 | 9/2013 | CaraDonna et al. |
| 8,688,935 | B1 * | 4/2014 | Yochai .................. G06F 3/0608 707/639 |
| 8,775,663 | B1 | 7/2014 | Singh |
| 2002/0083037 | A1 | 6/2002 | Lewis et al. |
| 2008/0307345 | A1 | 12/2008 | Hart et al. |
| 2009/0222496 | A1 | 9/2009 | Liu et al. |

OTHER PUBLICATIONS

Final Written Decision, Before the Patent Trial and Appeal Board of United States Patent and Trademark Office, Case IPR2015-00128, U.S. Pat. No. 8,468,174 B1, Apr. 27, 2016, 74 Pages, Paper 8.
Final Written Decision, Before the Patent Trial and Appeal Board of United States Patent and Trademark Office, Case IPR2015-00128, U.S. Pat. No. 8,468,174 B1, Apr. 27, 2016, 74 Pages, Paper 61.
Final Written Decision, Before the Patent Trial and Appeal Board of United States Patent and Trademark Office, Case IPR2015-00016 & IPR2015-00019, U.S. Pat. No. 8,150,808 B2, Apr. 13, 2016, 107 Pages.
Final Written Decision, Before the Patent Trial and Appeal Board of United States Patent and Trademark Office, Case IPR2015-00014, U.S. Pat. No. 8,150,808 B2, Apr. 13, 2016, 92 Pages.
Final Written Decision, Before the Patent Trial and Appeal Board of United States Patent and Trademark Office, Case IPR2015-00025 & IPR2015-00026, U.S. Pat. No. 8,161,077 B2, Apr. 12, 2016, 94 Pages.
Final Written Decision, Before the Patent Trial and Appeal Board of United States Patent and Trademark Office, Case IPR2015-00052, U.S. Pat. No. 8,548,944 B2, Mar. 31, 2016, 25 Pages.
Final Written Decision, Before the Patent Trial and Appeal Board of United States Patent and Trademark Office, Case IPR2015-00050, U.S. Pat. No. 8,548,944 B2, Mar. 31, 2016, 26 Pages.
Final Written Decision, Before the Patent Trial and Appeal Board of United States Patent and Trademark Office, Case IPR2015-00108, U.S. Pat. No. 8,566,361 B2, Apr. 29, 2016, 61 Pages.
Final Written Decision, Before the Patent Trial and Appeal Board of United States Patent and Trademark Office, Case IPR2015-00108, U.S. Pat. No. 8,566,361 B2, May 11, 2016, 57 Pages.
Boppana, U., "Using FlexClone to Clone Files and LUNs," NetApp Technical Report, Mar. 2010, 32 Pages.
Creek, T., "Applications for Writeable LUNs and LUN Cloning in Oracle Environments," NetApp, Technical Report, Jun. 2003, 10 Pages.
Degwekar, A., "Using SnapMirror with SnapDrive for UNIX," NetApp Technical Report, 2007, 11 Pages.
Gmane, Discussion regarding "File level snapshots in ZFS," From the zfs-discuss@opensolaris.org mailing list, Mar. 30, 2007, 1 Page, Can be retrieved at <URL:http:--article.gmane.org-gmane.os. solaris.openolaris.zfs-7759-match=snapshot>.
Gmane, Discussion regarding "ZFS Clone Promotion [PSARC-2006-303 Timeout: May 12, 2006]," From the zfs-discuss@opensolaris.org mailing list, May 9, 2006, 2 Pages, Can be retrieved at <URL:http:--article.gmane.org-gmane.os.solaris. opensolaris.zfs-194-match=clone>.
Gmane, Discussion regarding "ZFS Clone Promotion [PSARC-2006-303 Timeout: May 12, 2006]," From the zfs-discuss@opensolaris.org mailing list, May 10, 2006, 1 Page, Can be retrieved at <URL:http:--article.gmane.org-gmane.os.solaris. opensolaris.zfs-224-match=cloning>.
Gmane, Discussion regarding "ZFS Clone Promotion [PSARC-2006-303 Timeout: May 12, 2006]," From the zfs-discuss@opensolaris.org mailing list, May 10, 2006, 1 Page, Can be retrieved at <URL:http:--article.gmane.org-gmane.os.solaris. opensolaris.zfs-229-match=zfs+clone+promotion>.
Gmane, Discussion regarding "ZFS snapshot improvement," From the zfs-discuss@opensolaris.org mailing list, May 10, 2006, 1 Page, Can be retrieved at <URL:http:--article.gmane.org-gmane.os. solaris.openolaris.zfs-232-match=snapshot>.
Gmane, Discussion regarding "ZFS promotions," From the zfs-discuss@opensolaris.org mailing list, Dec. 12, 2008, 2 Pages, Can be retrieved at <URL:http:--article.gmane.org-gmane.os.solaris. openolaris.zfs-22347-match=clone>.
Higgins, B., et al., "Backup and Recovery Snap Manager for SQL Server," DLA Piper, Nov. 2008, 37 Pages.
Hitz, D., et al., "File System Design for an NFS File Server Appliance," Technical Report, USENIX, Winter 1994, 23 Pages.
Jackson, J., "ZFS: The future for storage networks?; File system has massive capacity, but licensing issues and architectural concerns persist," Government Computer News, Media, Inc., Jun. 25, 2007, 2 Pages.
Kay, D., "Working with ZFS Snapshots," Solaris 10 How-To Guides, Version 1.0, Sun Microsystems, Inc., Jan. 5, 2009, 8 Pages.
Kilvansky, M., "A Thorough Introduction to FlexClone Volumes," NetApp, Technical White Paper, Oct. 2004, 35 Pages.
Lal, J., et al., "DB2: Cloning a Database using NetApp FlexClone Technology," NetApp, Apr. 30, 2006, 60 Pages.
Merrill, J., et al., "SnapVault Best Pratices Guide," NetApp Technical Report, 2008, 29 Pages.
Nadgir, N., "Databases and ZFS," Oracle Blog, Sep. 25, 2006, 8 Pages, Can be retrieved from <URL:https:--blog.oracle.com-realneel-entry-zfs_and_databases>.
Network Appliance, Inc., "Data ONTAP 7.2 Commands: Manual Page Reference, vol. 1," May 16, 2008, 615 Pages.
Network Appliance, Inc., "NetApp Data Management for Decision Support Systems," 2005-2010, 4 Pages.
Network Appliance, Inc., "Flexvol and Flexclone Software," 2006, 2 Pages.
Network Appliance, Inc., "SnapManager 3.0 for Oracle Installation and Administration Guide," Nov. 2008, 294 Pages.
Network Appliance, Inc., "SnapManager 2.2 for Oracle Installation and Administration Guide," Nov. 2007, 310 Pages.
Network Appliance, Inc., "SnapManager 5.0 for Microsoft SQL Server Installation and Administration Guide," Oct. 2008, 492 Pages.
Network Appliance, Inc., "Network Appliance Snapmirror Software," 2006, 2 Pages.
Oracle, "Oracle Database Backup and Recovery User's Guide," 11g Release 1(11.1), Aug. 2008, 598 Pages.
Osuna, A., "An Introduction to FlexClone Volumes" Redbooks, IBM, 2006, 50 Pages.
Osuna, A., "Using IBM DB2 UDB with IBM System Storage N series" Redbooks, IBM, Dec. 2006, 136 Pages.
Osuna, A., "Data Protection Strategies in IBM System Storage N Series" Redbooks, IBM, Jun. 2008, 90 Pages.
Osuna, A., "IBM System Storage N Series SnapMirror" Redbooks, IBM, Jul. 2006, 124 Pages.

(56) References Cited

OTHER PUBLICATIONS

Osuna, A., "IBM System Storage N Series SnapVault Best Practices Guide" Redbooks, IBM, 2007, 54 Pages.
Patel, D., et al., "Rapid Database Development and Deployment," NetApp White Paper, Mar. 2007, 11 Pages.
Patterson, H., et al., "SnapMirror: File System Based Asynchronous Mirroring for Disaster Recovery," USENIX Association, Proceedings of the Fast 2002 Conference on File and Storage Technologies, Jan. 28-30, 2002, 14 Pages.
Sadagopan, P., et al., "Oracle Fusion Middleware DR Solution Using NetApp Storage," NetApp Technical Report, May 2008, 38 Pages.
Schuettinger, S., "NetApp Technical Report—Rapid Deployment of Oracle Database 11g Using VMWare Infrastructure and NetApp Flexclone," NetApp, Jan. 2008, 24 Pages.
Schuettinger, S., "Helping DBAs Become More Efficient NetApp Efficiency and Manageability Advantages," NetApp White Paper, Jul. 2009, 12 Pages.
Sun Microsystems, Inc., "Solaris ZFS Administration Guide," Aug. 2006, 164 Pages.
Sun Microsystems, Inc., "Solaris ZFS Administration Guide," Mar. 2009, 292 Pages.
Sun Microsystems, Inc., "System Administration Guide: Virtualization Using the Solaris Operating System," Oct. 2009, 562 Pages.
Syncsort Incorporated, "Near-Instant Oracle Cloning with Syncsort AdvancedClient Technologies," Synscort, White Paper, 2007, 12 Pages.
Syncsort Incorporated, "Syncsort Backup Express Advanced Recovery for NetApp," Synscort, 2008, 12 Pages.
Watanabe, S., "Solaris 10 ZFS Essentials," Sun Microsystems, 2010, 146 Pages.
Wikipedia, "ZFS," Last Modified Jul. 22, 2014, 14 Pages.
Chapman et al., "SnapMirror® Best Practices Guide, NetApp, Inc. Technical Report TR-3446," Apr. 2006, 63 Pages.
Edwards, et al., "FlexVol: Flexible, Efficient File Volume Virtualization in WAFL," Jun. 22, 2008, 22 Pages.
IBM, "IBM System Storage San Volume Controller Software V4.3.0 introduces space-efficient VDisks and VDisk mirroring," IBM United States Announcement 208-114, May 13, 2008, 17 Pages.
Microsoft, "Microsoft Developer's Network, Pages and Extents," Microsoft Corporation ("Pages and Extents") Sep. 2007, 2 Pages.
Mullins, "Excerpts of DB2 Developer's Guide, Fifth Ed." May 2004, 5 Pages.
NetApp, 2007 NetApp, Inc., Data ONTAP 7.1 Data Protection Online Backup and Recovery Guide, NetApp Technical Doc, Jan. 12, 2007, pp. 508.
NetApp, "Datasheet FlexClone," NetApp Technical Doc, 2008, 2 Pages.
NetApp, "Datasheet FlexVol™ and FlexClone™ Software," NetApp Technical Doc, 2004, 2 Pages.
NetApp, "Datasheet Netapp SnapManager for Oracle," NetApp Technical Doc, 2008, 2 Pages.
NetApp, "Datasheet NetApp SnapMirror," NetApp Technical Doc, 2008, 2 Pages.
NetApp, "Datasheet NetApp Snapshot Technology," NetApp Technical Doc, 2004, 1 Page.
Ranganathan, A., and Neto, A., "Technical Report, SnapManager 3.0 for Oracle Best Practices, TR-3761" Apr. 2009, 88 Pages.
Sun Microsystems, Inc., "ZFS The File System of the Future," Apr. 27, 2009, 19 Pages.
Tate, J., et al., "Implementing the IBM System Storage SAN Volume Controller V4.3," IBM Redbook SG24-6423-06, Oct. 2008, 970 Pages.
VMware, Inc. and EMC Corporation, "Accelerate Oracle Database log Creation and Deployment Using VMware Infrastructure and EMC Celerra Writeable Checkpoints," Mar. 2008, 16 Pages.
VMware, Inc. and IBM "Using IBM® TotalStorage® Enterprise Storage Server® FlashCopy® Function with the VMware ESX 2.5 Server ("ESX IBM")," Sep. 1, 2005, 25 Pages.
VMware, Inc., "Using Clones to Streamline Development ("Ws5 Clones")," 2005, 9 Pages.
VMware, Inc., "Using VMware Infrastructure for Backup and Restore ("Esx3")," 2006, 20 Pages.
VMware, Inc., "Workstation 5 User's Manual ("WS5 Manual")," 2006, 492 Pages.
Declaration of Erez Zadok in Support of Petition for Inter Partes Review of U.S. Pat. No. 8,161,077, Oct. 6, 2014, 87 Pages.
Declaration of Erez Zadok in Support of Petition for Inter Partes Review of U.S. Pat. No. 8,161,077, Oct. 6, 2014, 95 Pages.
Declaration of Erez Zadok in Support of Petition for Inter Partes Review of U.S. Pat. No. 8,468,174, Oct. 23, 2014, 98 Pages.
Declaration of Erez Zadok in Support of Petition for Inter Partes Review of U.S. Pat. No. 8,468,174, Oct. 23, 2014, 99 Pages.
Declaration of Erez Zadok in Support of Petition for Inter Partes Review of U.S. Pat. No. 8,566,361, Oct. 21, 2014, 99 Pages.
Declaration of Erez Zadok in Support of Petition for Inter Partes Review of U.S. Pat. No. 8,566,361, Oct. 21, 2014, 84 Pages.
Declaration of Erez Zadok in Support of Petition for Inter Partes Review of U.S. Pat. No. 8,150,808, Oct. 2, 2014, 85 Pages.
Declaration of Erez Zadok in Support of Petition for Inter Partes Review of U.S. Pat. No. 8,150,808, Oct. 2, 2014, 78 Pages.
Declaration of Erez Zadok in Support of Petition for Inter Partes Review of U.S. Pat. No. 8,150,808, Oct. 2, 2014, 84 Pages.
Declaration of Erez Zadok in Support of Petition for Inter Partes Review of U.S. Pat. No. 8,150,808, Oct. 6, 2014, 97 Pages.
Declaration of Erez Zadok in Support of Petition for Inter Partes Review of U.S. Pat. No. 8,548,944, Oct. 7, 2014, 98 Pages.
Declaration of Erez Zadok in Support of Petition for Inter Partes Review of U.S. Pat. No. 8,548,944, Oct. 8, 2014, 98 Pages.
Petition for Inter Partes Review of U.S. Pat. No. 8,161,077, Oct. 6, 2014, 62 Pages.
Petition for Inter Partes Review of U.S. Pat. No. 8,161,077, Oct. 6, 2014, 65 Pages.
Petition for Inter Partes Review of U.S. Pat. No. 8,468,174, Oct. 23, 2014, 64 Pages.
Petition for Inter Partes Review of U.S. Pat. No. 8,566,361, Oct. 21, 2014, 66 Pages.
Petition for Inter Partes Review of U.S. Pat. No. 8,150,808, Oct. 3, 2014, 65 Pages.
Petition for Inter Partes Review of U.S. Pat. No. 8,150,808, Oct. 3, 2014, 61 Pages.
Petition for Inter Partes Review of U.S. Pat. No. 8,150,808, Oct. 7, 2014, 65 Pages.
Petition for Inter Partes Review of U.S. Pat. No. 8,548,944, Oct. 8, 2014, 66 Pages.
Petition for Inter Partes Review of U.S. Pat. No. 8,548,944, Oct. 8, 2014, 65 Pages.
Notice of Grounds for Rejection for Japanese Patent Application No. P2014-155597, Apr. 21, 2015, 5 Pages.
Kakinoki, T., et al., "Query Language for Enterprise Data Integration in SaaS Environment," Institute of Electronics, Information and Communication Engineers, Data Engineering Workshop Collected Papers No. 19, (DEWS 2008 C3-1), Japan, The Institute of Electronics, Information and Communication Engineers, Data Engineering Research Committee, Apr. 7, 2008, 4 Pages. (With English Abstract).

\* cited by examiner

REPLICATING SNAPSHOTS FROM A SOURCE STORAGE SYSTEM TO A TARGET STORAGE SYSTEM

CROSS REFERENCES TO RELATED APPLICATIONS

This application claims the benefit of U.S. Provisional Application No. 62/111,955, filed on Feb. 4, 2015, which is incorporated by reference in its entirety.

BACKGROUND

This invention relates to replication of data stored in storage systems in general and more specifically to replication of snapshots stored in a storage system to another storage system.

Software applications used by enterprises often incorporate sensitive data for which access must be carefully controlled. Certain privileged users may be allowed access to the sensitive data. However, several users of systems of an enterprise may not be given access to the sensitive data. These users need to handle representative data for specific purposes. For example, if there is a defect or bug in a program, developers and testers often need to reproduce the conditions under which the defect was caused. This often requires using the original dataset, for example, to reproduce the original conditions. However, the developers and testers are not privileged users and are not allowed to have access to the sensitive data. Enterprises often use data masking to transform or obfuscate the sensitive data such that the original sensitive data cannot be discerned by users.

This masking operation is typically handled by people specializing in information technology (IT) infrastructure management, and involves creating copies of the data and masking them before making the copies available to the developer. This process is time consuming and cumbersome. Furthermore, keeping copies of masked data requires additional storage. If developers and testers make copies of the original dataset on a regular basis, the amount of additional storage used for storing the masked data can become significant. Conventional data masking techniques have shortcomings in the way they make secure data available to application developers and the way the secure data is stored. These shortcomings become worse when applied across multiple application versions, distributed development teams, and different security roles.

SUMMARY

To address the needs unmet by existing database technologies, embodiments of the invention replicate snapshots stored on a source storage system to a target storage system. The source storage system stores parent-child relationships between snapshots. A parent snapshot can be related to multiple child snapshots, each of which can include data modifications distinct from other child snapshots. The source storage system performs replication of a snapshot to a target storage system by identifying a subset of data blocks of the snapshot that are different from a previously replicated snapshot. The source storage system transmits the identified subset of data blocks to the target storage system. This allows the target storage system to reconstruct the snapshot by combining the data blocks received from the source storage system with data blocks of the previously replicated snapshot.

In an embodiment, the source storage system replicates a first snapshot to the target storage system and receives a request to replicate a second snapshot. The source storage system identifies data blocks of the second snapshot that are different from the first snapshot as follows. The source storage system identifies a common ancestor snapshot of both the first snapshot and the second snapshot. The source storage system compares the time of modification of data blocks of the first and second snapshots with the time of creation of the common ancestor snapshot. The source storage system determines whether a data block of the second snapshot is distinct from a corresponding data block of the first snapshot based on the comparison.

The source storage system determines that a data block of the second snapshot is distinct from a corresponding data block of the first snapshot if the time of modification of the data block of the second snapshot is greater than the time of creation of the common ancestor snapshot. The source storage system further determines that a data block of the second snapshot is distinct from a corresponding data block of the first snapshot if the time of modification of the corresponding data block of the first snapshot is greater than the time of creation of the common ancestor snapshot. The source storage system transmits data blocks of the second snapshot determined to be distinct from the corresponding data blocks of the first snapshot, to the target storage system.

In an embodiment, the common ancestor snapshot identified is the most recent common ancestor of the first snapshot and the second snapshot based on the parent-child relationships.

The features and advantages described in this summary and the following detailed description are not all-inclusive. Many additional features and advantages will be apparent to one of ordinary skill in the art in view of the drawings, specification, and claims.

Figure 1:
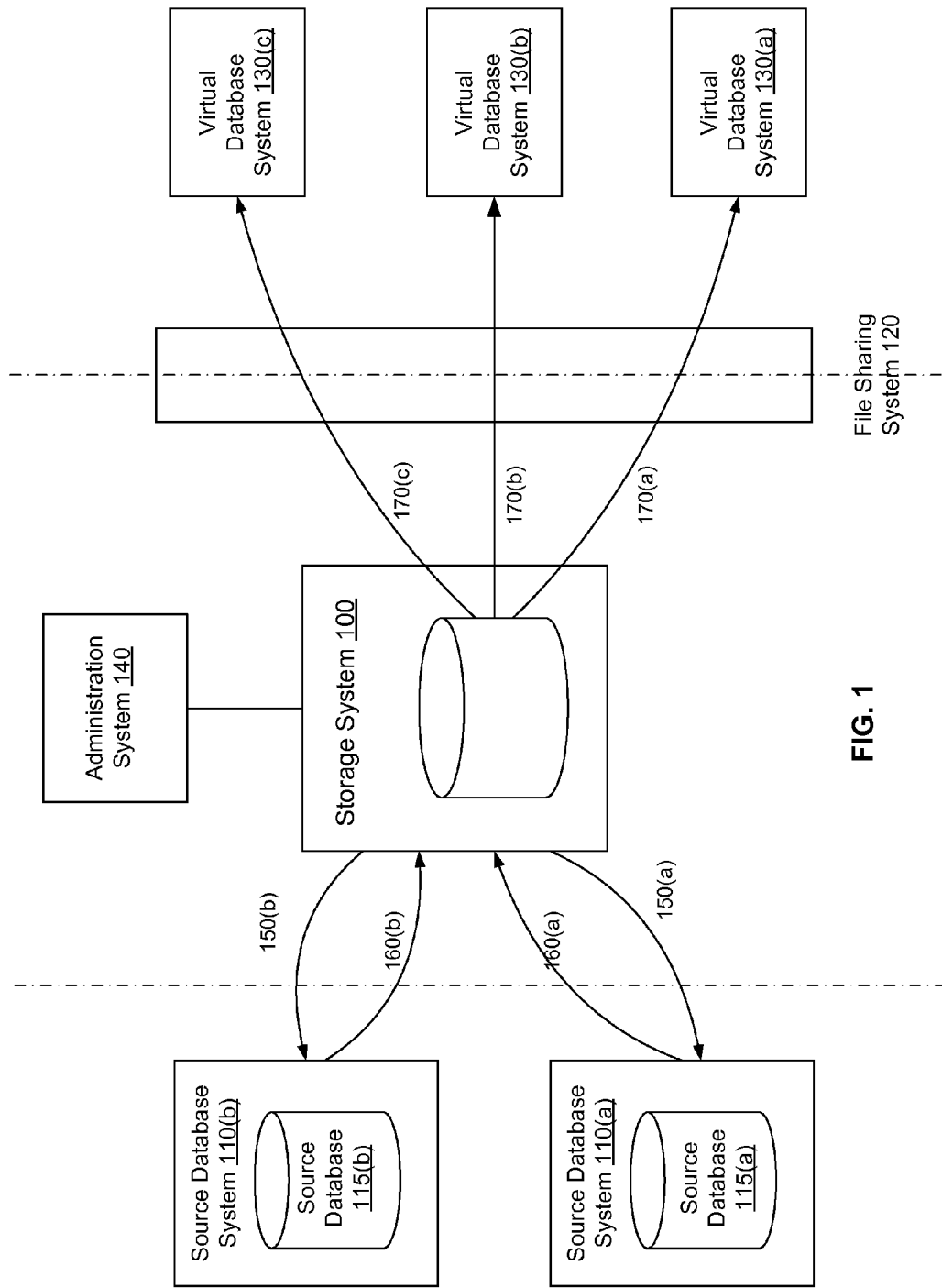
FIG. 1 is diagram illustrating copying of information from a source database to a storage system for provisioning as virtual databases, according to an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments replicate snapshots of data stored on a source storage system to a target storage system. The source storage system minimizes the data transmitted to the target storage system by avoiding transmission of data that is already present at the target storage system. The source storage system identifies data blocks of a snapshot being replicated that are distinct from data blocks of a previously replicated snapshot and transmits them to the target storage system. The snapshot being replicated and the previously replicated snapshot are not required to have a parent-child or ancestor-descendant relationship (a parent-child relationship indicates that the child snapshot was created from the parent snapshot). The target storage system reconstructs the replicated snapshot by combining the newly received data blocks along with the data blocks of the previously replicated snapshot.

The techniques disclosed herein allow replication of secure snapshots obtained by applying a masking function (or any transformation function) to data. For example, a portion of data stored in a snapshot may be identified as sensitive data that requires special privileges for access. These snapshots are referred to as un-secure snapshots since they store sensitive data in unmasked form. Since a snapshot shares data blocks with other snapshots, the storage system makes a copy of a data block before updating data of the data block. The masking operation modifies data blocks of an un-secure snapshot. Therefore, the storage system makes copies of data blocks of the un-secure snapshot for masking the sensitive data since the original unmasked data block may be shared with other un-secure snapshots.

As a result, each secure snapshot stores a distinct copy of a masked data block even if the masked data block is obtained from the same unmasked data block. Transmission of all masked data blocks of a secure snapshot results in significant amount of data being transmitted to the target storage system and also requires additional storage at the target storage system for storing the masked data blocks. Therefore, embodiments identify and transmit data blocks of a secure snapshot that are distinct from data blocks of a previously transmitted secure snapshot. The target storage system reconstructs the masked snapshot based on the data blocks received and data blocks of the previously received secure snapshot. In other words, the target storage system creates the replicated snapshot by storing the data blocks received from the source target system as data blocks for the replicated snapshot and sharing the remaining data blocks of the previously replicated secure snapshot.

The techniques disclosed herein can be used for replicating snapshots in general, whether or not they are secure snapshots. Furthermore, the snapshots at the source storage system and the target storage system can be used for creating and provisioning virtual databases as described below.

Virtual Databases

Storage systems store multiple point-in-time copies of a source database using snapshots. Sharing of data blocks across snapshots allows efficient storage of the point-in-time copies of the source database. Virtual databases corresponding to points in time of the source database are provisioned using the storage system. Virtual database systems are described in U.S. patent application Ser. No. 12/603,541 filed on Oct. 21, 2009, now issued as U.S. Pat. No. 8,150,808, which is incorporated by reference herein in its entirety. Storage systems may be used for other purposes, for example, for storing point in time copies of file systems for purposes of taking backups of file systems. Backup systems based on stored snapshots of data are described in U.S. patent application Ser. No. 13/183,131 filed on Jul. 14, 2011, now issued as U.S. Pat. No. 8,548,944, which is incorporated by reference herein in its entirety.

A virtual database created for a point in time is stored as a set of files that contain the information of the database as available at that point in time. Each file includes a set of database blocks and the data structures for referring to the database blocks. A virtual database may be created on a database server by creating the database files for the source database corresponding to the state of the source database at a previous point in time, as required for the database server.

The files of the virtual database are made available to the database server using a file sharing mechanism, which links the virtual database to the appropriate database blocks stored on the storage system. The process of making the virtual database available to a database server is called "provisioning" the virtual database. Multiple virtual databases can be provisioned based on the state of the source database at the same point in time.

FIG. 1 is a diagram illustrating copying of information from a source database to a storage system for provisioning as virtual databases, according to an embodiment of the invention. The source database systems 110 manage data for an organization. The storage system 100 retrieves data associated with databases from one or more source database systems 110 and stores the data in an efficient manner, further described below. A database administrator user interface allows a database administrator to perform various actions supported by the storage system 100.

In response to a request from the administration system 140, or based on a predefined schedule, the storage system 100 may send a request 150 for data to a source database system 110. The source database system 110 responds by sending information stored in the source database as a stream of data 160. The request 150 is sent periodically and the source database system 110 responds by sending information representing changes of data stored in the source database since the last response 160 sent by the source database system 110. The storage system 100 receives the data 160 sent by the source database system 110 and stores the data. The storage system 100 stores the information efficiently, for example, by keeping versions of database blocks that have changed and reusing database blocks that have not changed.

To create a virtual database, the storage system 100 creates files that represent the information corresponding to the source database system 110 at a given point in time. The storage system 100 exposes 170 the corresponding files to a virtual database system 130 using a file sharing system 120. The virtual database system 130 runs a database server that can operate with the files exposed 170 by the storage system 100. Hence, a virtual copy of the source database is created for the virtual database system 130 for a given point in time in a storage efficient manner.

A database block may be shared between different files, each file associated with a different virtual database. In particular, a database block is shared if the corresponding virtual database systems 130 are only reading the information in the database block and not writing to the database block. In one embodiment, the virtual database manager 330 makes copies of the database blocks only if necessary. For example, a particular database block may be shared by multiple virtual databases that read from the same database block. But if one of virtual database systems 130 attempts to write to the database block, a separate copy of the database block is made because the writing operation causes that database block to be different for the virtual database corresponding to that virtual database systems 130 than it is for the other virtual databases.

Replicating Masked Sensitive Data

The source database 115 may store sensitive data that needs to be masked before certain users are allowed to access the data. For example, one or more tables of the source database may store sensitive data such as credit card numbers, social security number, medical information, or any other private or sensitive information that requires restricted access to users. The source database may also include data that is not identified as sensitive and therefore can be presented to the users without being masked.

For example, a database in production may store information of users including sensitive information. The database may have to be replicated for debugging certain issue observed in the production system. Various developers and testers may have to access the replicated data to perform testing and debugging. However, the developers and testers may not be authorized to access/view the sensitive information, nor do they need to access the sensitive information to debug the problem. For example, if the issue identified in the production system is related to bad performance of a query, the developers/testers can use a replicated database in which the sensitive information is masked such that the developers/testers cannot discern the original data.

In an embodiment, the storage system 100 creates un-secure virtual databases that store the sensitive data in unmasked form and secure virtual databases that store the sensitive data in masked form. Privileged users with permission to access the sensitive data may be provided access to un-secure VDBs. Users that are not privileged to access the unmasked sensitive data are not allowed to access the unsecure VDBs. These users can be provided access to the secure virtual databases that store sensitive data in masked form. Accordingly, the storage system 100 creates un-secure virtual databases for access by privileged users and secure VDBs for access by users that are not privileged to access the sensitive data.

The storage system 100 creates secure virtual databases by masking sensitive data stored in the database blocks of the un-secure virtual databases. The masking operation is performed by applying a transformation function to mask the data and replacing the sensitive data with the masked data. As a result, the database blocks of an un-secure virtual database that store sensitive data get modified (i.e., for example, as a result of updating data, deleting data, or inserting data). In an embodiment, the masking of the data is performed by executing an update statement on the columns of tables storing the sensitive data. For example, the storage system 100 may execute an SQL (structured query language) update statement that replaces the sensitive data values with masked data values obtained by applying a masking function to the sensitive data values.

In some embodiments, the storage system 100 clones an unsecure snapshot (i.e., makes a copy of the unsecure snapshot) to create a secure snapshot. The storage system 100 masks the sensitive data in the copy of the unsecure snapshot to obtained masked sensitive data for the secure snapshot. The storage system 100 provisions secure VDBs (virtual databases) from the secure snapshot.

In some embodiments, the storage system 100 is used for storing data other than data of databases, for example, the storage system 100 may store unstructured data or user files. The storage system 100 creates snapshots of data that represent state of the data at a particular point in time. A snapshot is associated with the point in time at which the snapshot was created. The data of the storage system may be received from a source system. The past states of data can be obtained by accessing the data of a particular snapshot. In some embodiments, the storage system 100 creates secure copies of a snapshot by applying a masking function to a portion of data of the snapshot identified as sensitive data.

Replication of Secure Snapshots/VDBs

The storage system 100 replicates VDBs or snapshots to another storage system, for example, a target storage system. The replication allows the data to be available at multiple storage systems. The target storage system may be used as a hot standby or for disaster recovery. The target storage system may be used for faster access by a set of users, for example, users working at a remote location compared to the location of the source storage system.

For security purposes, an enterprise may impose a policy that certain data identified as sensitive data is never stored in the target storage system, and therefore never transmitted to the target storage system. This ensures that users of the target system 100b do not have access to the unmasked sensitive data. This simplifies proving that an enterprise using the target systems is compliant with access control policies. Accordingly, the source storage system may store both unsecure VDBs/snapshots as well as secure VDBs/snapshots but replicate only secure VDBs/snapshots to the target system.

Figure 2:
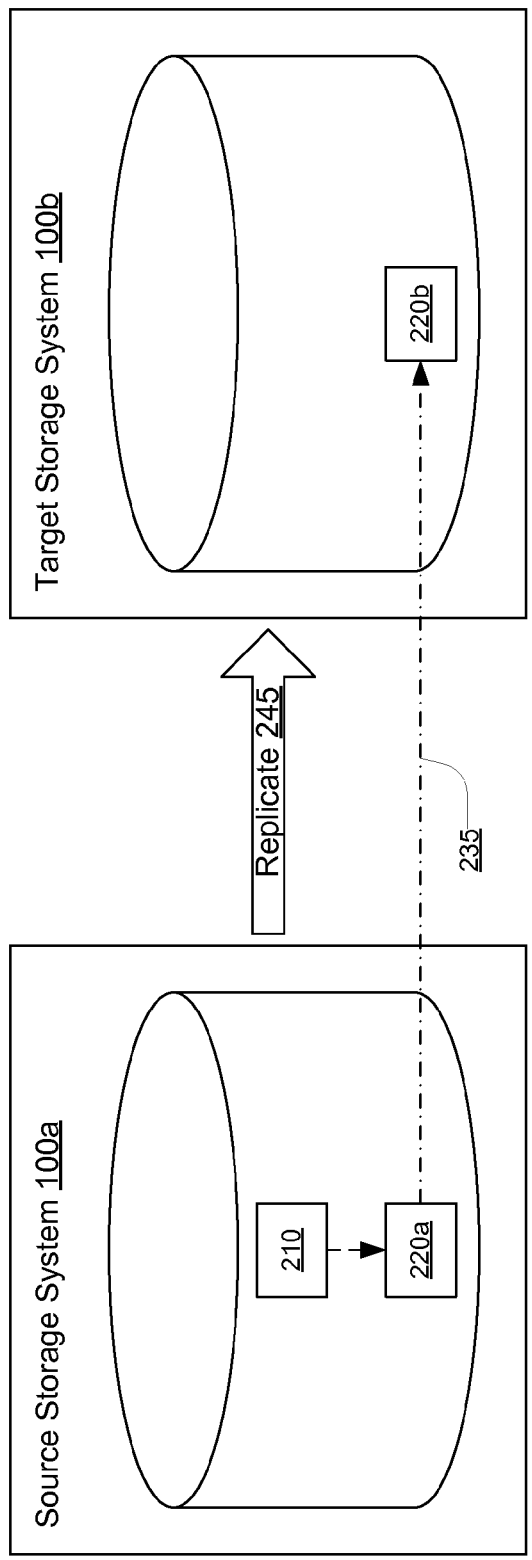
FIG. 2 illustrates replication of snapshots of data stored in a source storage system to a target storage system, according to an embodiment of the invention.

FIG. 2 illustrates replication of snapshots of data stored in a source storage system to a target storage system, according to an embodiment of the invention. As shown in FIG. 2, the source storage system 100a stores an unsecure snapshot 210 storing data identified as sensitive data in unmasked form, i.e., original form without applying any masking function. The source storage system 100a applies a masking function to the unsecure snapshot 210 to obtain the secure snapshot 220a. Accordingly, applications that are configured to process the sensitive data in the original format are unable to process the sensitive data. Similarly, users that are able to interpret the sensitive data in original formal are unable to interpret the masked data.

The source storage system 100a replicates 245 data stored in snapshots to the target system. The source system 100a and the target system 100b enforce a constraint that sensitive data is not transmitted to the target system 100b and therefore, never stored on the target system 100b. Accordingly, the source storage system 100a replicates only the secure snapshot 220 and does not replicate snapshot 210 that stores unmasked sensitive data. The source storage system 100a replicates 235 the secure snapshot 220a to the target system 100b. The replicated secure snapshot 220a is stored as the snapshot 220b on the target system 100b.

System Architecture

Figure 3:
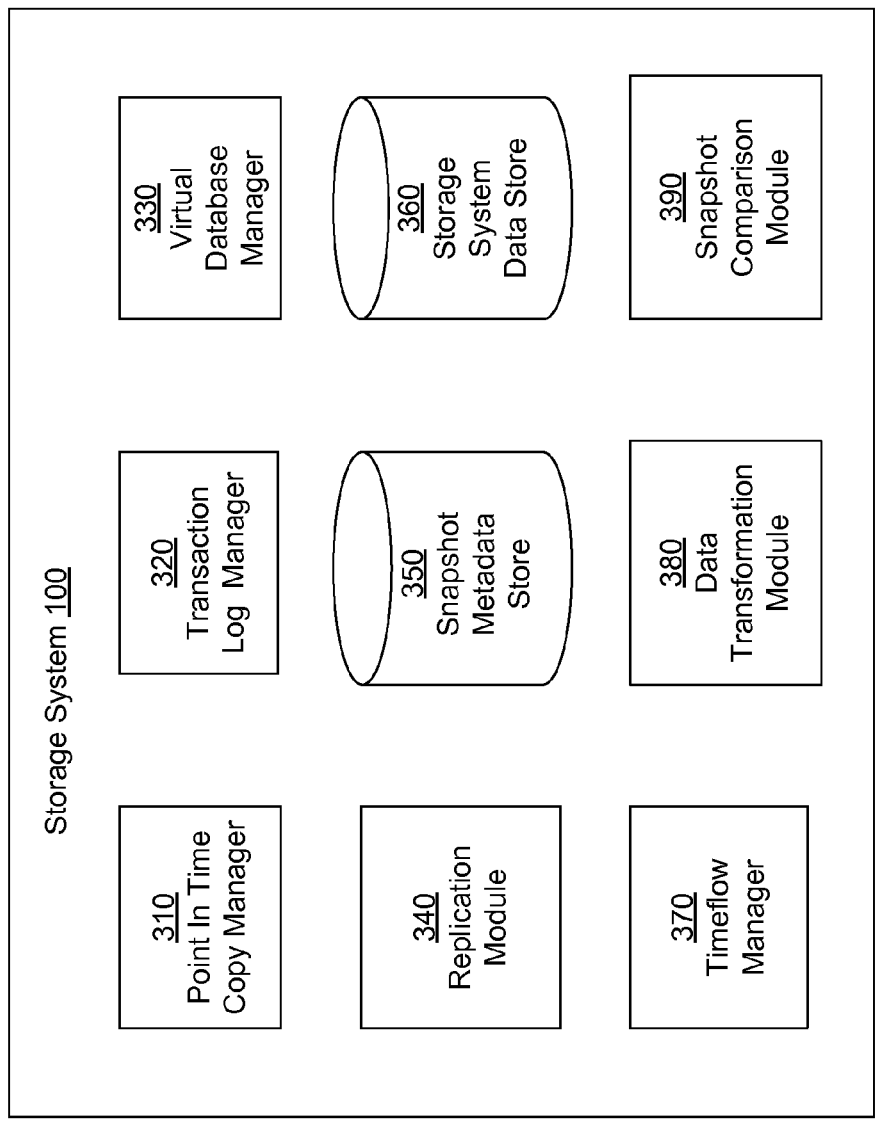
FIG. 3 illustrates the architecture of a storage system for performing replication of snapshots, in accordance with an embodiment of the invention.

FIG. 3 illustrates the architecture of a storage system for creating secure virtual databases, in accordance with an embodiment of the invention. The storage system 100 includes a point-in-time copy manager 310, a transaction log manager 320, a virtual database manager 330, a replication module 340, a snapshot metadata store 350, a timeflow manager 370, a data transformation module 380, a storage system data store 360, and a snapshot comparison module 390. In alternative configurations, different and/or additional modules can be included in the storage system 100. Furthermore, functions performed by a particular module may be performed by other modules than those indicated herein.

The point-in-time copy manager 310 interacts with the source database system 110 by sending a request to the source database system 110 to retrieve information representing a point-in-time copy of the source database 115. The point-in-time copy manager 310 stores the data obtained from the source database 115 in the storage system data store 360. The data retrieved by the point-in-time copy manager 310 corresponds to database blocks (or pages) of the database being copied from the source database. After a first point-in-time copy request to retrieve information stored in source database 115, a subsequent point-in-time copy is received in a second request. The data collected in the first request is combined with the data collected in a second request to reconstruct a copy of the source database corresponding to a point in time at which the data was retrieved from the source database 115 for the second request.

The transaction log manager 320 sends request to the source database system 110 for retrieving portions of the transaction logs stored in the source database system 110. The data obtained by the transaction log manager 320 from the source database system 110 is stored in the storage system data store 360. In one embodiment, a request for transaction logs retrieves only the changes in the transaction logs in the source database system 110 since a previous request for the transaction logs was processed. The database blocks retrieved by a point in time copy manager 310 combined with the transaction logs retrieved by the transaction log manager 320 can be used to reconstruct a copy of the source database corresponding to times in the past in between the times as which point-in-time copies are made.

The virtual database manager 330 receives requests for creation of a virtual database for a virtual database system 130. The request for creation of a virtual database may be sent by a database administrator using the administration system 140 and identifies a source database system 110, a virtual database system 130, and includes a past point-in-time corresponding to which a virtual database needs to be created. The virtual database manager 330 creates the necessary files and data structures corresponding to the virtual database being created and shares the files with the virtual database system 130. The database administrator for a virtual database system 130 may be different from a database administrator for the source database system 110.

The storage system data store 360 stores data obtained from the source database systems 110. The storage system data store 360 stores various point-in-time copies associated with different points in time obtained from the source database systems 110. The point-in-time copies of a source database may share database blocks. For example, if a database block does not change between two points in time T1 and T2, the point-in-time copies associated with T1 and T2 may share the database block. The storage system data store 360 also stores transaction logs obtained from the source database systems 110. The storage system data store 360 stores data structures representing virtual databases created by the storage system 100. The storage system data store 360 stores the time at which a data block gets modified, for example, as a result of an update operation. The storage system data store 360 distinguishes updates performed internally by the storage system, for example, for masking data from the updates performed by external sources, for example, an application using a virtual database, or the changes based on the source database. Accordingly, the storage system data store 360 stores only the time of modification of a data block based on external sources, for example, an application using a virtual database, or the changes based on the source database and ignores the internal updates, for example, for masking sensitive data.

The snapshot metadata store 350 stores metadata describing snapshots. In particular, the snapshot metadata store 350 stores the time at which each snapshot is created. The snapshot metadata store 350 maintains parent-child relationships between snapshots. If the storage system 100 creates a snapshot S1 corresponding to data received from a source database system and subsequently, creates the next snapshot S2 based on the subsequent set of data received from the source database (without any snapshots created in between S1 and S2 based on data received from the source database), the snapshot S1 is a parent of snapshot S2 and correspondingly snapshot S2 is a child of snapshot S1. Similarly, of the source system 100 creates a copy S' of a snapshot S, the snapshot S is a parent of snapshot S' and correspondingly snapshot S' is a child of snapshot S.

The timeflow manager 370 maintains storage, update, and retrieval of information associated with one or more timeflows corresponding to a virtual database or a snapshot. The timeflow manager 370 stores information describing one or more time points along the timeflows, sequence change numbers and transaction logs associated with updates or modifications to the VDB files, snapshots of the files at a subset of the time points along the timeflows, and the like. According to an embodiment, a representation of a timeflow stores information describing changes performed on a source database or a VDB. In an embodiment, the changes are stored in a storage efficient manner. For example, at various point-in-time copies (or snapshots) of the data of the source database or VDB is stored such that one or more database blocks are shared across the snapshots. In particular, database blocks that do not change are shared across two consecutive snapshot and database blocks that are updated are copied before the updates are made. In an embodiment, the information describing the changes also comprises transaction logs representing changes made in the time duration between capturing of two point-in-time copies.

The timeflow manager 370 maintains a representation called a container for storing and encapsulating snapshots and VDBs for a timeflow. In an embodiment, the container that stores unsecure snapshots/VDBs with unmasked sensitive data is called an unsecure container and a container that stores secure snapshots/VDBs with masked sensitive data is called secure container. Management of timeflows is described in U.S. patent application Ser. No. 14/324,485 filed on Jul. 7, 2014, which is incorporated by reference herein in its entirety.

The data transformation module 380 transforms data retrieved from the source databases by applying transformation functions to the data. An example of a transformation function is a masking function applied for obfuscating data. This may include, but is not limited to, masking out digits, replacing names from a dictionary, or mathematical transformations. As an example, the data transformation module 380 performs masking by replacing either a portion of a number (i.e., a string of digits) with one or more characters. For example, if a number represents a social security number or a credit card number, the transformation function may replace a prefix of the number with a character, such as 'x'. Accordingly, the data transformation module 380 replaces a number "123 456" with "xxx 456." In an embodiment, the data transformation module 380 performs masking by using a dictionary to map a term to another term. A dictionary may provide mappings from names people to different names. For example, the data transformation module 380 may use a dictionary to replace all occurrences of "Mark" with "Michael", all occurrences of "Mary" with "Nancy" and so on. The data transformation module 380 may mask numbers by performing certain mathematical transformation. For example, each digit may be replaced by the next digit in order of increasing value, such as replacing 0 by 1, 1 by 2, 2 by 3, 3, by 4, and so on and replacing 9 by 0. Accordingly, number "239" is replaced by "340". These are examples of masking functions and various other masking functions may be used by the data transformation module 380. For example, the data transformation module 380 may use cryptographic functions that map a value to another value from which decrypting the original value is not possible.

As described above, the data transformation module 380 masks data for creating secure snapshots. In an embodiment, the database storage system invokes the data transformation module 380 to mask the sensitive data obtained from a source database. The database storage system creates a VDB from a snapshot and the data transformation module 380 executes one or more database commands, for example SQL (structure query language) commands to replace data of the VDB with masked data. For example, if a database table T1 of the VDB includes a column credit_card_number storing sensitive data, the data of the column may be masked by executing a command "update T1 set credit_card_number=masking_function(credit_card_number, seed)" where "seed" is an input seed value used by the masking function.

The replication module 340 performs replication of snapshots or virtual databases from the storage system to other storage systems. The replication module 340 executes processes described herein to ensure that data of a snapshot/VDB is efficiently transmitted to the target storage system. The replication module 340 ensures that unmasked sensitive data from a source database is not transmitted to a target storage system. In other words, the replication module 340 module ensures that only snapshots/VDBs with masked sensitive data are replicated to the target storage system. The various processes executed by the replication module 340 to transmit the data of a snapshot efficiently are described herein.

Figure 9:
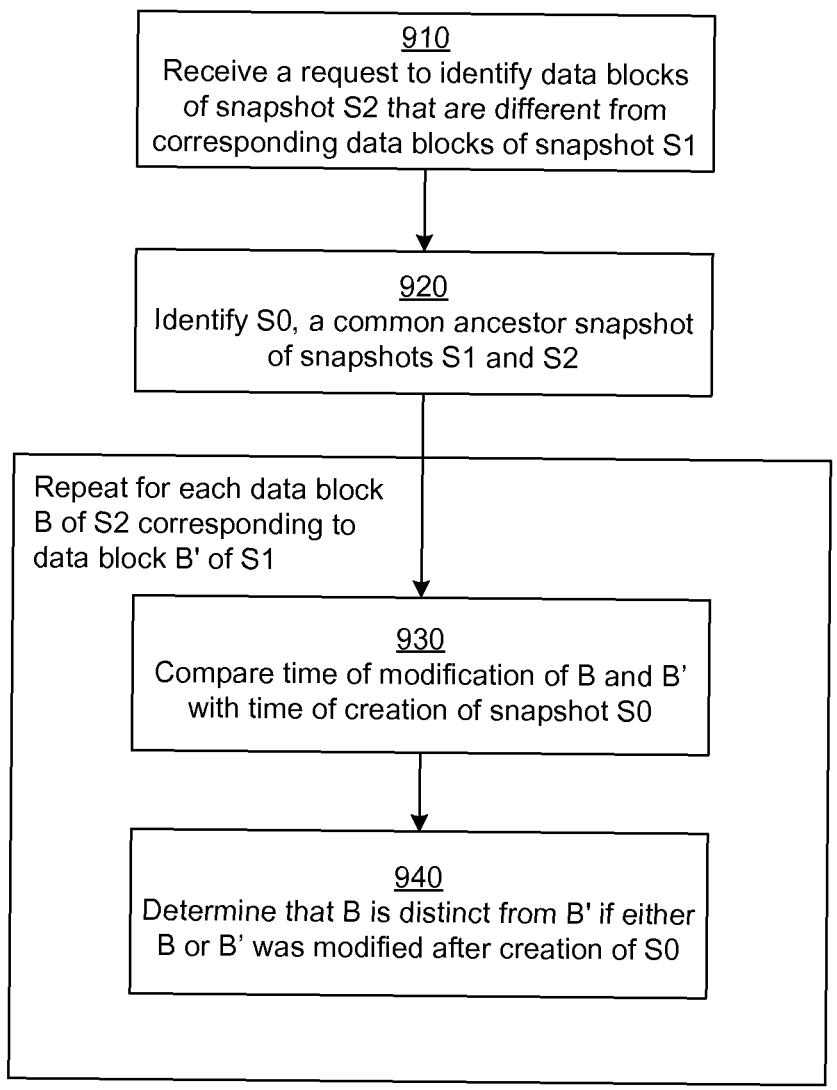
FIG. 9 is a flowchart of a process for identifying data blocks of a snapshot that are distinct from another snapshot, according to an embodiment of the invention.

The snapshot comparison module 390 compares two snapshots to identify data blocks of a snapshot that are distinct compared to data blocks of the other snapshot. The two snapshots are assumed to be derived from a common ancestor snapshot and can be modified independently. Furthermore each snapshot includes modification distinct from the modifications of the other snapshot that are performed after the creation of the common ancestor snapshot. The processes used for comparing the snapshots are described herein, for example, as illustrated in FIG. 9.

Creating Secure Snapshots

Figure 4:
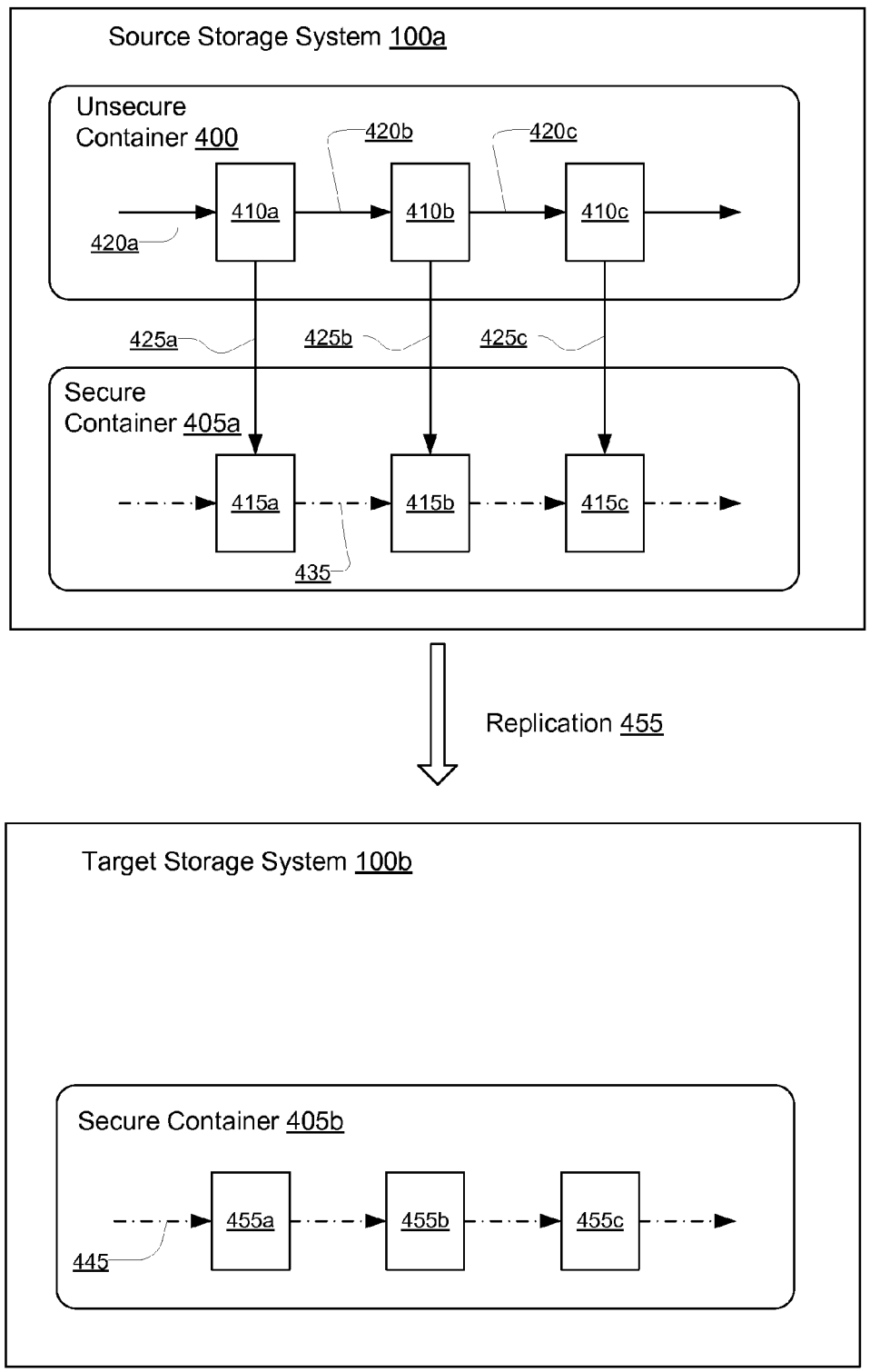
FIG. 4 shows an example of a secure container including multiple secure snapshots created from unsecure snapshots of an unsecure container and replication of the secure snapshots to a target storage system, according to an embodiment of the invention.

FIG. 4 shows an example of a secure container including multiple secure snapshots created from unsecure snapshots of an unsecure container and replication of the secure snapshots to a target storage system, according to an embodiment of the invention. The source storage system 100a includes an unsecure container 400 and a secure container 405a. The unsecure container 400 stores unsecure snapshots 410a, 410b, and 410c associated with a time flow. As shown in FIG. 4, the snapshot 410b was created using snapshot 410a and snapshot 410c was created using snapshot 410b. Accordingly, snapshot 410b is a child of snapshot 410a and a parent of snapshot 410c. Similarly, snapshot 410c is a child of snapshot 410b. The parent-child relations along the timeflow of unsecure container 400 are shown using arrows 420.

The source storage system 100a further creates secure snapshots 415a, 415b, and 415c based on the unsecure snapshots 410a, 410b, and 410c respectively. In an embodiment, the point-in-time copy manager creates a copy of an unsecure snapshot by performing a clone operation. The data transformation module 380 applies the masking function to sensitive data of the copy of the snapshot to obtain the secure snapshot 415. The relation between an unsecure snapshot 410 and a corresponding secure snapshot 415 is shown as arrows 425.

The snapshot metadata store 350 stores parent-child relations based on the relations 420 and 425. Accordingly, secure snapshot 415a is child of unsecure snapshot 410a, secure snapshot 415b is child of unsecure snapshot 410b, and secure snapshot 415c is child of unsecure snapshot 410c. The arrows 435 simply show the relation between secure snapshots based on relationships between corresponding unsecure snapshots. However, the snapshot metadata store 350 does not store parent-child relations between the secure snapshots based on the relations 435 since each secure snapshot shown in the secure container 450 is not created as a child of another secure snapshot.

As shown in FIG. 2, the storage system 100 replicates only secure snapshots on the target system 100b. Accordingly, only the snapshots 415a, 415b, and 415c stored in the secure container 405 are replicated 455 to the target storage system 100b and stored on the target storage system 100b as secure snapshots 455a, 455b, and 455c respectively. A secure container 405b is created on the target storage system 100b. The replication module 340 may replicate secure snapshots 415 as they are created along the timeflow indicated by arrows 420. In other words, the replication module 340 first replicates snapshot 415a as snapshot 455a, next the replication module 340 replicates snapshot 415b as snapshot 455b, and subsequently the replication module 340 replicates snapshot 415c as snapshot 455c. The replication module 340 replicates each snapshot efficiently by identifying and sending only the data blocks that changed compared to a previous snapshot that was sent.

Figure 5:
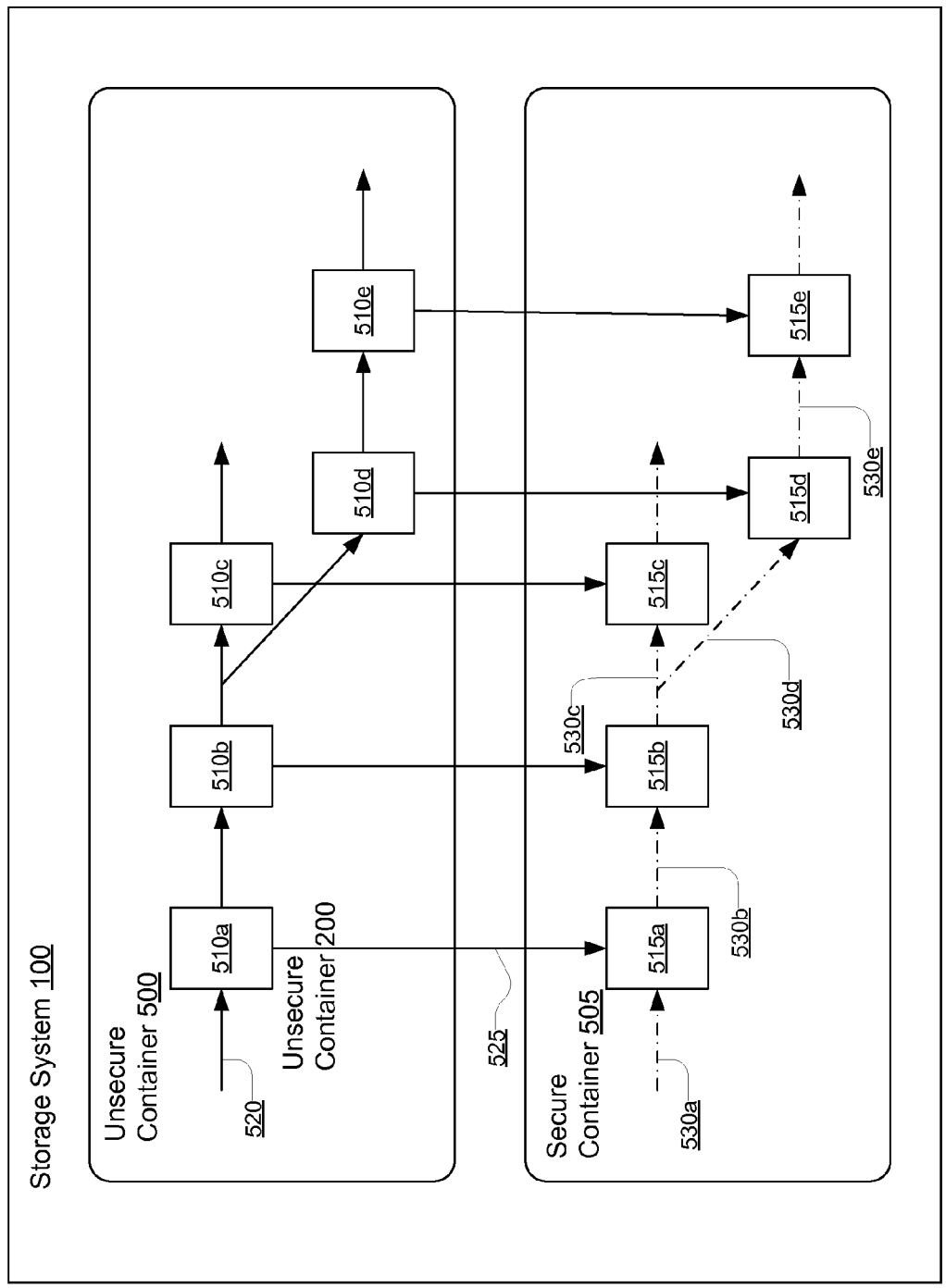
FIG. 5 shows another example of a secure container including multiple secure snapshots created from unsecure snapshots of an unsecure container, according to an embodiment of the invention.

FIG. 5 shows another example of a secure container including multiple secure snapshots created from unsecure snapshots of an unsecure container, according to an embodiment of the invention. FIG. 5 illustrates that a new time flow may be created in an unsecure container 500 from an existing time flow. As shown in FIG. 5, the unsecure snapshot 510d is created by cloning the snapshot 510b. Accordingly, a snapshot 510b has two child snapshots, snapshot 510c and 510d that can be modified independently. New snapshots can be created based on each child snapshot of the snapshot 510b. For example, snapshot 510e is created as a child snapshot of snapshot 510d. The secure snapshots 515a, 515b, 515c, 515d, and 515e may be replicated to the target system and stored in a secure container of the target system, for example, secure container 405b shown in FIG. 4.

The storage system 100 creates secure snapshots 515 for secure container 505 based on the unsecure snapshots 510 of the unsecure container 500. For example, secure snapshots 515d and 515e are created from unsecure snapshots 510d and 510e. As shown in FIG. 5, arrows 530 are shown between the snapshots of the secure container based on relations between their parent snapshots. However, the arrows 530 do not indicate parent-child relations between the secure snapshots.

As shown in FIG. 5, a parent snapshot may have multiple child snapshots. For example, snapshot 510d has child snapshots 510e, and 515d and snapshot 510b has child snapshots 510c, 510d, and 515b. The child snapshots of the same parent snapshot can include modifications independent of each other. For example, snapshot 515b may include updates to data blocks that are distinct from updates to data blocks of snapshot 510c, even though both snapshots have the same parent snapshot 510b. As shown in FIG. 5, the secure snapshots of the secure container 505 are not related to each other by parent-child relationships. Since only secure snapshots of a secure container 505 are being replicated from the source storage system to the target storage system, a snapshot being replicated may not be a child or a descendant of a previously transmitted snapshot. Therefore, embodiments determine data blocks of a secure snapshot being replicated that are distinct from data blocks of a previously transmitted secure snapshot for transmitting to the target system.

Figure 6:
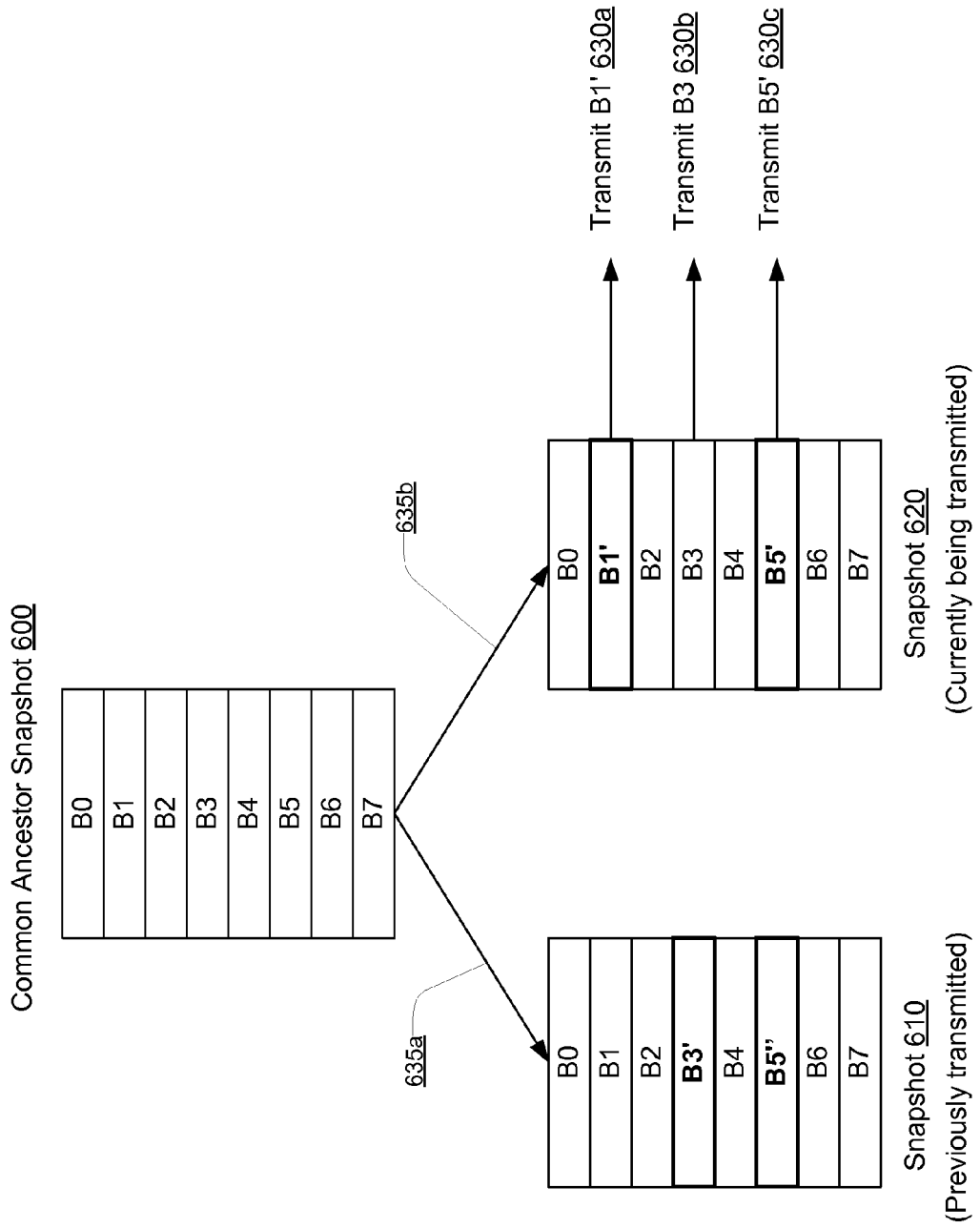
FIG. 6 illustrates identifying data blocks of a snapshot that are distinct from data blocks of another snapshot for transmitting to the target storage system, according to an embodiment.

FIG. 6 illustrates identifying data blocks of a snapshot that are distinct from data blocks of another snapshot for transmitting to the target storage system, according to an embodiment. The snapshots 600, 610, and 620 are stored in a source storage system. The example illustrated in FIG. 6 assumes that data of snapshot 610 is already transmitted to the target storage source system by the source storage system. The source storage system identifies data blocks of snapshot 620 for sending to the target storage system assuming snapshot 610 has been previously replicated. Since data blocks of snapshot 610 are assumed to be available at the target storage system, the source storage system transmits data blocks of snapshot 620 that are different from snapshot 610. The target storage system 620 can share data blocks of snapshot 610 with the snapshot 620 to avoid having to transmit and store data blocks that are common between the two snapshots.

Snapshot 600 is a common ancestor of snapshots 610 and 620. In an embodiment, the source storage system identifies the most recent common ancestor of snapshot 610 and 620. In other words, if there are multiple common ancestor snapshots of two given snapshots, the source storage system selects the common ancestor that has the largest (i.e., most recent) time of creation. Furthermore, even though the snapshot 600 is shown as linked to snapshots 610 and 620 by arrows 635a and 635b, the relationship indicated by arrows 635a and 635b does not have to be a direct parent child relationship. For example, snapshots 600 and 610 (or 600 and 620) may be linked to each other via other snapshots, forming an ancestor/descendant relationship.

For illustration purposes, each snapshot is shown has having 8 data blocks. However, the typical number of data blocks of a snapshot can be much higher. Snapshot 600 has data blocks B0, B1, B2, . . . , B7. Snapshot 610 (or 620) was created using snapshot 600 and may share data blocks of snapshot 600 when it was created. Subsequently, one or more data blocks of snapshot 610 (or 620) may have been modified. The data blocks of a snapshot may be modified by creating a VDB based on the snapshot and performing operations, for example, updates, deletes, inserts, in tables of the VDB. Note that each child snapshot may include modifications that are distinct from the modifications of the other child snapshot. Accordingly, snapshot 610 may include data blocks that are distinct from snapshot 620 and snapshot 620 may include data blocks that are distinct from snapshot 610. For example, data block B1 of snapshot 600 was modified to obtain the data block B1' of snapshot 610 and 600. Similarly, data block B3 of snapshot 600 was modified to obtain corresponding data block B3' of snapshot 620. Data block B5 of snapshot 600 was modified in snapshot 620 to obtain data block B5' and in snapshot 610 to obtain data block B5".

The storage system ignores modifications as a result of a masking operation or a transformation operation that is performed on data of each snapshot being replicated. This is so, because, these modifications are applied to data of each snapshot and as a result do not cause differences in data of two snapshots. For example, assume that secure snapshot S1' is obtained by masking data of unsecure snapshot S1 and secure snapshot S2' is obtained by masking data of unsecure snapshot S2. If a data block B is shared by unsecure snapshots S1 and S2, the masking operation results in generation of data block B1 in snapshot S1' and data block B2 in snapshot S2'. However, since the input for the masking operation is the same, the data of data blocks B1 and B2 is also same. Accordingly, the snapshot S1' and S2' can share the masked data bocks (e.g., snapshot S2' can use the data block B1 of snapshot S1').

The replication module 340 determines which data blocks of snapshot 620 are distinct and need to be transmitted. The replication module 340 identifies data blocks of snapshot 620 that were modified since the creation of snapshot 600. For example, the replication module 340 determines that data block B1' was modified since creation of snapshot 600. Accordingly, the replication module 340 transmits 630a the data block B1' to target system 100b. Furthermore, the replication module 340 determines that data block B3' of snapshot 610 was modified since the creation of snapshot 600. Accordingly, the replication module 340 determines that data block B3 of snapshot 620 is distinct from the data block B3' of snapshot 610 and transmits 630b block B3 of snapshot 620 to the target storage system. Finally, the replication module 340 determines that data block B5' of snapshot 620 and data block B5" of snapshot 610 were both modified since the creation of snapshot 600. Accordingly, the replication module 340 transmits the data block B5' to the target storage system 100b.

In the process illustrated by the example shown in FIG. 6, the source storage system 100a only transmits data blocks of snapshot 620 since data of snapshot 610 is assumed to be available in the target storage system. Furthermore, if a data block of either snapshot 610 or snapshot 620 is determined to have been modified since the creation of the common ancestor snapshot 600, the source storage system transmits the corresponding data block of the snapshot 620 to the target storage system 100b.

Figure 7:
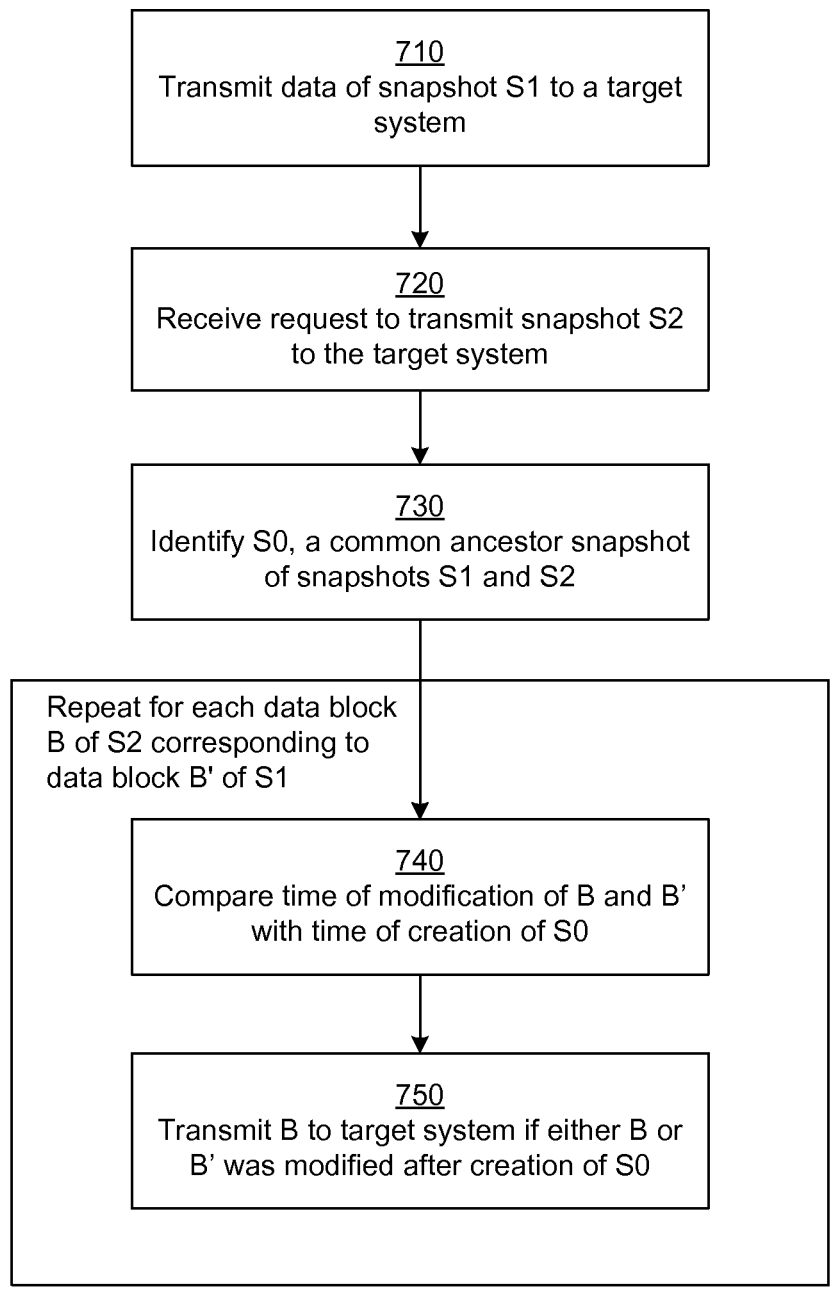
FIG. 7 is a flowchart of a process for identifying data blocks of a snapshot to be transmitted to a target system for replicating a snapshot, according to an embodiment of the invention.

FIG. 7 is a flowchart of a process for identifying data blocks of a snapshot for transmitting to a target system for replicating a snapshot, according to an embodiment of the invention. The process illustrated in FIG. 7 is executed in the source storage system 100a. The replication module 340 of source storage system 100a transmits 710 data of a snapshot S1 (for example, snapshot 610 shown in FIG. 6) to the target storage system 100b. If snapshot S1 is the first snapshot being transmitted 710 from the source storage system 100a to the target storage system 100b, the replication module 340 of source storage system 100a transmits all data blocks of the snapshot S1 to the target storage system 100b. However, if the source storage system 100a has previously transmitted snapshots to the target storage system 100b, the source storage system 100a may transmit 710 the snapshot S1 efficiently, by transmitting data blocks that are distinct compared to a previously transmitted snapshot, for example, by recursively invoking the process of FIG. 7.

The replication module 340 of the source storage system 100a further receives 720 a request to transmit another snapshot S2 to the target storage system 100b. For example, the snapshot S2 requested to be transmitted subsequently may be the snapshot 620 as shown in FIG. 6. The request to transmit snapshot S2 may be explicitly received from a user, for example, a system administrator via administration system 140. Alternatively, the request to transmit S2 may be generated by a scheduler that transmits snapshots to the target system 100b based on a policy.

The replication module 340 identifies 730 a common ancestor snapshot of snapshots S1 and S2, for example, snapshot S0 may be a common ancestor of S1 and S2. In an embodiment, the replication module 340 identified 730 the most recent common ancestor. The replication module 340 determines the common ancestor of two snapshots by traversing the parent-child relationships between snapshots stored in the snapshot metadata store 350. For example, if the snapshot metadata store 350 stores links from child snapshots to parent snapshots, the replication module 340 may traverse from each of the snapshots S1 and S2 to identify ancestors of the snapshots S1 and S2 until it finds a common ancestor.

The replication module 340 performs the following steps for each block B of snapshot S2 that corresponds to block B' of snapshot S1. In an embodiment, a block B of snapshot S2 corresponds to block B' of snapshot S1 if the two blocks have the same block id. The replication module 340 compares 740 the time of modification of blocks B and B' with the time of creation of the common ancestor snapshot S0. If any one of the blocks B or B' was modified after the time of creation of the snapshot S0, the replication module 340 transmits 750 the block B of snapshot S2 to the target storage system 100b.

The replication module 340 of the source storage system may traverse the modified blocks of snapshots S1 and S2 in various ways. In one embodiment, the replication module 340 creates two worker threats T1 and T2. The worker thread T1 scans the time of modification of data blocks of snapshot S1 and identifies data blocks that were modified after the time of creation of snapshot S0. Each worker thread T1 and T2 is associated with a FIFO (first in first out) queue. For example, worker thread T1 is associated with queue Q1 and worker thread T2 is associated with queue Q2.

The worker threads T1 and T2 traverse the blocks of snapshots S1/S2 in a well-defined order that can be repeated multiple times to achieve the same result, for example, in the order of block ids of the data blocks. If the worker thread T1 identifies any data block of snapshot S1 that was modified after the time of creation of snapshot S0, the worker thread T1 adds the data block to queue Q1. The worker thread T2 scans the time of modification of data blocks of snapshot S2 and identifies data blocks that were modified after the time of creation of snapshot S0. If the worker thread T2 identifies any data block of snapshot S2 that was modified after the time of creation of snapshot S0, the worker thread T2 adds the data block to queue Q2. The replication module 340 creates another thread T0 that processes data blocks added to the queues Q1 and Q2.

Figure 8:
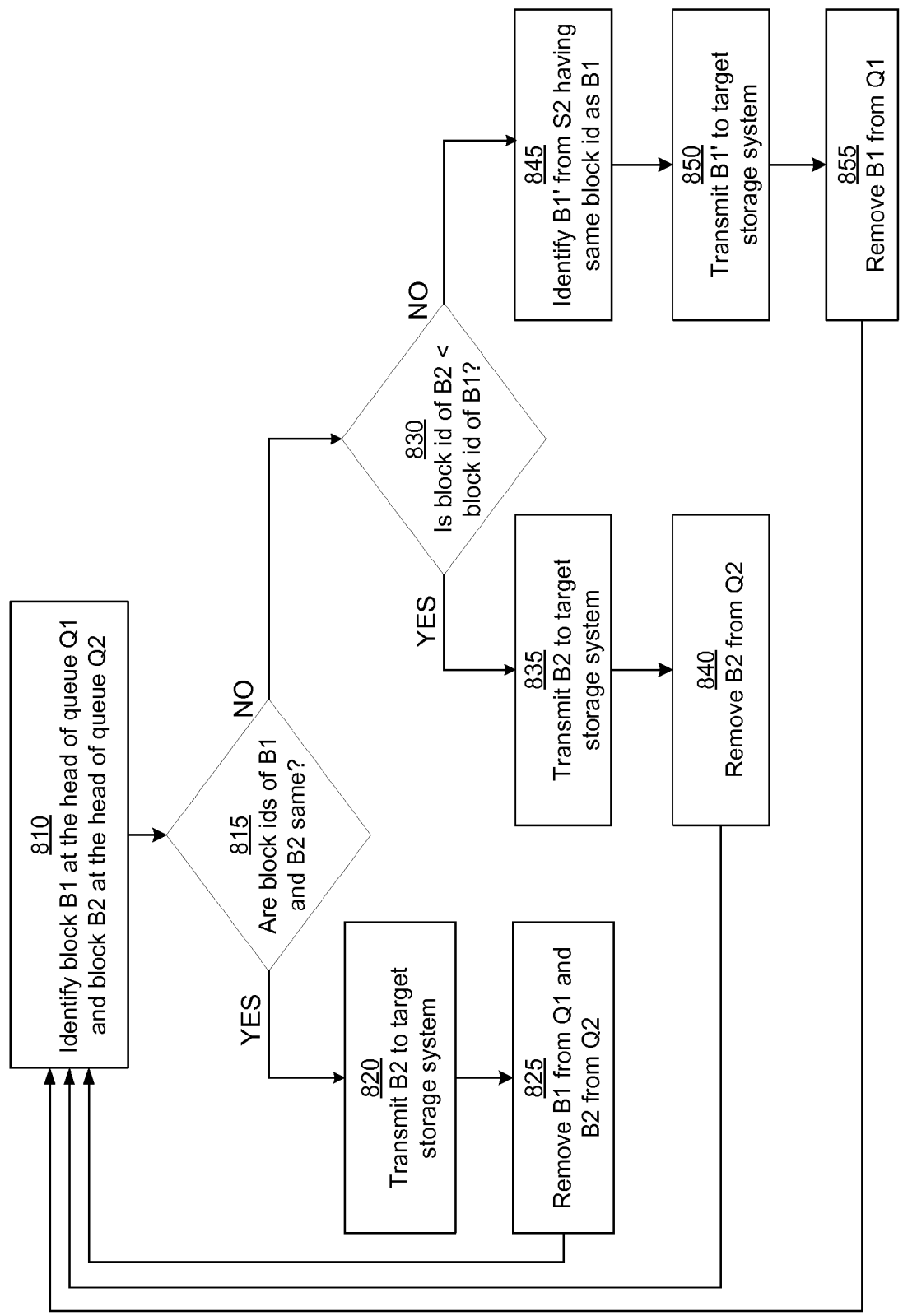
FIG. 8 is a flowchart of a process using worker threads processing queues storing modified blocks from two snapshots for identifying data blocks to be replicated to a target system, according to an embodiment of the invention.

FIG. 8 is a flowchart of a process using worker threads processing queues storing modified blocks from two snapshots for identifying data blocks to be replicated to a target system, according to an embodiment of the invention. The thread T0 identifies 810 blocks at the head of the queues Q1 and Q2. For example, assume that block B1 is at the head of queue Q1 and block B2 is at the head of queue Q2. Thread T0 compares the block ids of blocks B1 and B2. If thread T0 determines 815 that B1 and B2 have the same block id (say ID1), the replication module 340 transmits 820 block B2 to the target storage system 100b. The thread T0 removes 825 the block B1 from queue Q1 and block B2 from queue Q2. In this situation the block with block id ID1 from snapshot S0 was modified in both snapshots S1 and S2. Therefore thread T0 determines that the block B2 of snapshot S2 is distinct from the block B1 of snapshot S1 and is therefore transmitted 820 to the target storage system 100b.

If thread T0 determines 815 that the block ids of the blocks B1 and B2 are different, thread T0 identifies the block with smaller block id. Thread T0 processes the block that that has smaller block id first. If thread T0 determines 830 based on the comparison of the modification times that block B2 has smaller block id compared to block B1, thread T0 transmits 835 block B2 to the target storage system 100b. Thread T0 removes 840 block B2 from the queue Q2.

If thread T0 determines 830 that the block B1 has smaller block id than block B2, thread T0 identifies 845 the block of snapshot S2 having the same block id as block B1, for example, block B1'. The thread T0 transmits 850 block B1' to the target storage system 100b. Thread T0 removes 855 the block B1 from queue Q1. After each of the steps 825, 840, and 855 that remove blocks from their respective queues, the thread T0 performs the step 810 of identifying the blocks at the head of the queues Q1 and Q2.

Note that in the above description, B1 and B2 are variables of the process illustrated in FIG. 8. Accordingly, either B1 or B2 of a current iteration of the process may be identical to the corresponding block from a previous iteration. For example, step 840 removes block B2 from Q2. Accordingly, in the subsequent iteration, the variable B2 will point at the next block from queue Q2. However, variable B1 will continue to point at the same block as this iteration. Similarly, after step 855 that removes block B1 from Q1, in the next iteration, B1 will point at a new block from Q1 although B2 will continue to point at the same block as the block in the current iteration.

The use of the queues and the process illustrated in FIG. 8 allows comparison of the blocks in the two snapshots efficiently by using limited amount of memory. For example, another embodiment performs comparison of the blocks of the two snapshots by identifying all blocks of one of the snapshot (say snapshot S1) and adding information identifying the modified blocks (e.g., block id) of S1 in a hash table. Subsequently, the replication module 340 iterates through the modified blocks of the other snapshot (i.e., snapshot S2). For any modified block B1 of snapshot S2, the replication module 340 determines using the hash table whether there is a block B1' with matching block id in snapshot S1. If the replication module 340 determines that there is no block with matching id in snapshot S1, the replication module 340 transmits the block B1 to the target storage system. If the replication module 340 determines that there is a block B1' with matching id in snapshot S1, the replication module 340 transmits the block B1 to the target storage system and marks block B1' as already processed. Subsequently, the replication module 340 iterates through all unprocessed blocks B2 of snapshot S1 that have been modified since creation of S0 and identifies the corresponding block B2' of snapshot S2 having the same block ids. The replication module 340 transmits the block B2' to the target storage system 100b. This embodiment of replication module requires more in-memory storage compared to the process illustrated in FIG. 8, for example, to maintain the hash table that represents all the modified blocks of one of the snapshots (S1 or S2). In contrast, the embodiment illustrated in FIG. 8 stores only a subset of the modified blocks of snapshots at any given point in time in the queues Q1 and Q2 and accordingly can be managed with less in-memory storage.

Processes similar to those illustrated in FIGS. 7 and 8 can be used to compare and process data blocks of two snapshots that can be modified independently in various contexts. For example, assume that S1 and S2 are snapshots obtained by materializing two snapshots (also referred to as hydrating the snapshots) derived from the same common ancestor snapshot but independently modified. Materializing a snapshot comprises copying data blocks of two snapshots so as to make sure that no data blocks are shared between the two snapshots. The storage system 100 can use processes similar to those illustrated in FIGS. 7 and 8 to identify all data blocks of S2 that are different compared to corresponding data blocks of S2. The result of the comparison can be used to determine if data blocks of the two snapshots can be shared if necessary.

FIG. 9 is a flowchart of a process for identifying data blocks of a snapshot that are distinct from another snapshot, according to an embodiment of the invention. The snapshot comparison module 390 receives information identifying two snapshots S1 and S2. The snapshot comparison module 390 receives 910 a request to identify data blocks of S2 that are different from snapshot S1. The request may be explicitly received from a user, for example, a system administrator via administration system 140. Alternatively, the request to transmit S2 may be generated by a scheduler based on a policy.

The snapshot comparison module 390 identifies 920 a common ancestor snapshot of snapshots S1 and S2. For example, snapshot S0 may be a common ancestor of S1 and S2. The snapshot comparison module 390 finds the most recent common ancestor. In an embodiment, the snapshot comparison module 390 determines the common ancestor of two snapshots by traversing the parent child relationships between snapshots stored in the snapshot metadata store 350. For example, if the snapshot metadata store 350 stores links from child snapshots to parent snapshots, the snapshot comparison module 390 may traverse from each of the snapshots S1 and S2 to identify ancestors of the snapshots S1 and S2 until it finds a common ancestor.

The snapshot comparison module 390 performs the following steps for each block B of snapshot S2 that corresponds to block B' of snapshot S1 having the same block id. The snapshot comparison module 390 compares 740 the time of modification of blocks B and B' with the time of creation of the common ancestor snapshot S0. If any one of the blocks B or B' was modified after the time of creation of the snapshot S0, the replication module 340 determines 940 that the block B of snapshot S2 is distinct from the corresponding block B' of snapshot S1 having the same block id.

The various embodiments described in relation to FIG. 7 that identify data blocks of snapshots S1 and S2 that were modified for since creation of snapshot S0 can be used for the process of FIG. 8 also. For example, the replication module 340 may use the process illustrated in FIG. 8 based on two workers threads T1 and T2 associated with FIFO queues Q1 and Q2 for retrieving and storing modified data blocks of snapshots S1 and S2 and processing them. The process of FIG. 8 can be modified to work with the process of FIG. 9 by replacing the steps 820, 835, and 850 that transmit blocks of snapshot S2 to the target system to instead store information identifying the block of snapshot S2 that is distinct from the corresponding block of snapshot S1. Note that modifications to snapshots referred to herein exclude bulk updates performed to both snapshots, for example, for masking sets of sensitive data in both snapshots. This is so because if two identical data blocks are both transformed, the data blocks can still be shared between the two snapshots.

Additional Configuration Considerations

Embodiments disclosed herein describe replication of snapshots. A storage system may create a VDB based on a snapshot. VDBs share data blocks with other VDBs in the same manner that snapshots share data blocks with other snapshots. Accordingly, all techniques disclosed herein for replicating snapshots can be used for replicating VDBs. For example, the processed of FIGS. 7, 8, and 9 can be used by replacing the terms snapshot with the term VDB.

A database comprises data stored in a computer for use by computer implemented applications. A database server is a computer program that can interact with the database and provides database services, for example, access to the data stored in the database. Database servers include commercially available programs, for example, database servers included with database management systems provided by ORACLE, SYBASE, MICROSOFT SQL SERVER, IBM's DB2, MYSQL, and the like. A database may be implemented using a database model, for example, a relational mode, object model, hierarchical model or network model.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to these signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one. The singular also includes the plural unless stated otherwise.

Upon reading this disclosure, those of skill in the art will appreciate still additional alternative structural and functional designs for a system and a process for creating secure virtual databases from point-in-time copies of source databases stored in a storage manager. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for transmitting a snapshot from a source system to a target system, the method comprising:
   storing, in a source storage system, a plurality of snapshots, wherein a snapshot shares data blocks with one or more other snapshots stored in the source storage system;
   maintaining parent-child relationships between snapshots if a child snapshot is created from a parent snapshot, wherein at least a parent snapshot has a parent child relationship with two or more child snapshots created from the parent snapshot, such that each child snapshot can be modified independent of the other child snapshots;
   transmitting data of a first snapshot from the source storage system to a target storage system;
   identifying a second snapshot to transmit from the source storage system to a target storage system, wherein the first snapshot and the second snapshot have a common ancestor snapshot such that both the first snapshot and the second snapshot are descendants of the common ancestor snapshot based on parent child relationships;
   identifying data blocks of the second snapshot that are distinct from the first snapshot; and
   transmitting the identified data blocks of the second snapshot to the target storage system.

2. The method of claim 1, wherein identifying data blocks of the second snapshot that are distinct from the first snapshot is based on a comparison of the time of modification of one or more data blocks of the second snapshot with the time of creation of the common ancestor snapshot.

3. The method of claim 1, wherein identifying data blocks of the second snapshot that are distinct from the first snapshot is based on a comparison of the time of modification of one or more data blocks of the first snapshot with the time of creation of the common ancestor snapshot.

4. The method of claim 1, further comprising:
   sending a data block of the second snapshot to the target storage system if the data block was modified after the time of creation of the common ancestor snapshot.

5. The method of claim 1, further comprising:
   sending a data block of the second snapshot to the target storage system if a corresponding data block of the first snapshot was modified after the time of creation of the common ancestor snapshot.

6. The method of claim 5, wherein determining whether to transmit a data block of the second snapshot to the target storage system comprises:
   comparing a checksum of the data block of the second snapshot with a checksum of the corresponding data block of the first snapshot; and
   wherein the data block of the second snapshot is sent to the target storage system if the checksum of the data block of the second snapshot does not match the checksum of the corresponding data block of the first snapshot.

7. The method of claim 1, wherein determining whether to transmit a data block of the second snapshot to the target storage system comprises determining not to send the data block to the target storage system if the time of modification of the data block is before the time of creation of the common ancestor snapshot.

8. The method of claim 1, wherein the first snapshot includes a first set of data blocks modified after the creation of the ancestor snapshot and the second snapshot includes a second set of data blocks modified after the creation of the common ancestor snapshot, wherein the first set and the second set are non-overlapping.

9. The method of claim 1, wherein identifying the common ancestor snapshot comprises identifying the most recent common ancestor snapshot.

10. The method of claim 1, wherein a child snapshot corresponding to a parent snapshot is obtained by cloning the parent snapshot.

11. The method of claim 1, wherein a child snapshot corresponding to a parent snapshot is obtained by applying a masking function to at least a portion of data of the parent snapshot.

12. The method of claim 1, wherein a parent snapshot and a child snapshot have a parent child relationship if the parent snapshot and the child snapshot are two consecutive snapshots created in the source storage system.

13. A method for determining the differences between snapshots, the method comprising:
   storing, in a source storage system, a plurality of snapshots, wherein a snapshot shares data blocks with one or more other snapshots stored in the source storage system;
   maintaining parent-child relationships between snapshots if a child snapshot is created from a parent snapshot, wherein at least a parent snapshot has a parent child relationship with two or more child snapshots created from the parent snapshot, such that each child snapshot can be modified independent of the other child snapshots;

receiving a request to identify the differences between a first snapshot and a second snapshot;

identifying a common ancestor snapshot such that both the first snapshot and the second snapshot are descendants of the common ancestor snapshot based on the parent child relationships; and determining that a data block of the second snapshot is different from a corresponding data block of the first snapshot based on a comparison of the time of modification of the data block and the time of creation of the common ancestor snapshot.

14. The method of claim 13, further comprising:

determining that the data block of the second snapshot is different from the corresponding data block of the first snapshot if the time of modification of the data block is greater than the time of creation of the common ancestor snapshot.

15. The method of claim 13, further comprising:

determining that the data block of the second snapshot is different from the corresponding data block of the first snapshot if the time of modification of the corresponding data block of the first snapshot is greater than the time of creation of the common ancestor snapshot.

16. The method of claim 15, wherein determining whether a data block of the second snapshot is different from a corresponding data block of the first snapshot, comprises:

comparing a checksum of the data block of the second snapshot with a checksum of the corresponding data block of the first snapshot; and wherein the data block of the second snapshot is determined to be different from the corresponding data block of the first snapshot if the checksum of the data block of the second snapshot does not match the checksum of the corresponding data block of the first snapshot.

17. The method of claim 13, further comprising:

determining that the data block of the second snapshot is same as the corresponding data block of the first snapshot if the time of modification of the data block of the first snapshot is less than the time of creation of the common ancestor snapshot and the time of modification of the corresponding data block of the first snapshot is less than the time of creation of the common ancestor snapshot.

18. The method of claim 13, wherein the first snapshot includes a first set of data blocks modified after the creation of the ancestor snapshot and the second snapshot includes a second set of data blocks modified after the creation of the common ancestor snapshot, wherein the first set and the second set are non-overlapping.

19. The method of claim 13, wherein identifying the common ancestor snapshot comprises identifying the most recent common ancestor common snapshot.

20. The method of claim 13, wherein a child snapshot corresponding to a parent snapshot is obtained by cloning the parent snapshot.

21. The method of claim 13, wherein a parent snapshot and a child snapshot have a parent child relationship if the parent snapshot and the child snapshot are two consecutive snapshots created in the file system.

22. The method of claim 13, wherein a child snapshot corresponding to a parent snapshot is obtained by applying a masking function to at least a portion of data of the parent snapshot.

23. A non-transitory computer-readable storage medium storing instructions for:

storing, in a source storage system, a plurality of snapshots, wherein a snapshot shares data blocks with one or more other snapshots stored in the source storage system;

maintaining parent-child relationships between snapshots if a child snapshot is created from a parent snapshot, wherein at least a parent snapshot has a parent child relationship with two or more child snapshots created from the parent snapshot, such that each child snapshot can be modified independent of the other child snapshots;

transmitting data of a first snapshot from the source storage system to a target storage system;

identifying a second snapshot to transmit from the source storage system to a target storage system, wherein the first snapshot and the second snapshot have a common ancestor snapshot such that both the first snapshot and the second snapshot are descendants of the common ancestor snapshot based on parent child relationships;

identifying data blocks of the second snapshot that are distinct from the first snapshot; and transmitting the identified data blocks of the second snapshot to the target storage system.

* * * * *

UNITED STATES PATENT AND TRADEMARK OFFICE
CERTIFICATE OF CORRECTION

PATENT NO. : 9,600,193 B2  
APPLICATION NO. : 14/816775  
DATED : March 21, 2017  
INVENTOR(S) : Matthew Allan Ahrens et al.

Page 1 of 1

It is certified that error appears in the above-identified patent and that said Letters Patent is hereby corrected as shown below:

In the Claims

Claim 13, Column 20, Line 55, "the differences" should read as --differences--  
Claim 19, Column 22, Line 6, "ancestor common snapshot" should read as --ancestor snapshot--

Signed and Sealed this  
Tenth Day of July, 2018

Andrei Iancu  
*Director of the United States Patent and Trademark Office*